Patented Aug. 12, 1941

2,252,485

UNITED STATES PATENT OFFICE 2,252,485

COATING COMPOSITION

Carl Max Hull, Chicago, Ill., assignor to Standard Oil Company, Chicago, Ill., a corporation of Indiana No Drawing. Application October 30, 1937, Serial No. 172,037

3 Claims. (Cl. 260—36)

This invention relates to coating compositions and particularly to coating compositions containing plasticized chlorinated high molecular weight synthetic hydrocarbon resins known as viscoresins.

Certain unsaturated hydrocarbons, notably isobutylene, can be polymerized at low temperatures under the influence of catalysts such as boron trifluoride to produce high molecular weight synthetic hydrocarbon resins which are sometimes known as viscoresins. These viscoresins can be chlorinated to produce a different and in some respects more desirable type of resin. Particularly when a large proportion of chlorine is introduced into the viscoresin molecule, the chlorinated resin produced is very hard and brittle. In general this brittleness is a decided disadvantage when the resin is to be used in coating compositions and my invention overcomes this disadvantage while retaining the desirable properties of these chlorinated resins.

It is an object of my invention to provide new and improved coating compositions containing chlorinated viscoresins and particularly chlorinated viscoresins having a high chlorine content. Another object of my invention is to provide such coating compositions in which the desirable hardness of the chlorinated viscoresins and their desirable waterproofing and gloss producing properties are retained but in which the objectionable brittleness is overcome by the use of certain placticizing agents. A more specific object of my invention is to provide such coating compositions in which the plasticizing agent is compatible with the chlorinated viscoresin and enhances its solubility in various solvents. A still further object of my invention is to provide coating compositions containing chlorinated viscoresins plasticized with materials which do not materially reduce flame resistant characteristics of the chlorinated viscoresins themselves. Other and more detailed objects of my invention will become apparent as the description thereof proceeds.

In the manufacture of viscoresins liquefied olefinic hydrocarbons, and especially liquefied normally gaseous hydrocarbons, containing isoolefins, for example isobutylene, are subjected to the polymerizing action of metal halide catalysts, particularly aluminum chloride, boron chloride or boron (tri)fluoride, by which they are converted into high molecular weight plastic hydrocarbon resins. The molecular weight of these intermediate products may vary from 800 to 12,000 or higher and is affected considerably by the temperature at which the polymerization is conducted. It is preferred to employ temperatures below 30° F. and a temperature between —40° F. and —80° F. is desirable.

The chlorinated viscoresin is produced by subjecting the high molecular weight hydrocarbon resin made by the process of the preceding paragraph to the action of chlorine with or without the presence of a catalyst—usually in the presence of sunlight—and it is preferred to employ during the chlorination a suitable organic solvent such as carbon tetrachloride, ethylene dichloride, hexane, etc. Chlorinated organic solvents are preferred.

In many respects the highly chlorinated viscoresins, particularly those containing from about 45% to about 65% chlorine have many desirable properties. For one thing the highly chlorinated viscoresins contain the chlorine in a more stable form than is the case with viscoresins chlorinated to a lesser degree. In other words, loss of chlorine through evolution of hydrogen chloride is less in the case of the more highly chlorinated viscoresins. Furthermore, the flame resistant properties of the viscoresins increases with the chlorine content. More important, the ability of the chlorinated viscoresin to act as a waterproofing and gloss producing agent is increased by the high chlorine content.

With these advantages of a high degree of chlorination goes a disadvantage which makes the highly chlorinated viscoresin relatively unsuitable for use in coating compositions. This disadvantage lies in the fact that these highly chlorinated viscoresins are very brittle.

I have found that the highly chlorinated viscoresins, particularly those containing from about 45% to about 65% of chlorine, can be rendered highly suitable for use in coating compositions, for instance for coating paper, fabrics, Cellophane, leather, armature windings, insulated wire, concrete, etc., by incorporating therein a compatible chlorinated plasticizing agent.

The chlorinated viscoresin thus plasticized can be dissolved in a suitable solvent such as toluene, xylene, carbon tetrachlorine or mixtures thereof to give a coating composition which produces a film having very unusual luster, flexibility, resistance to chemicals and resistance to fire. Pigments, dyes and other color bodies can, of course, be added and fillers of various kinds can likewise be used.

As a plasticizing agent I prefer to use chlorinated paraffin wax or other chlorinated hydrocarbon wax such as chlorinated ceresin or chlorinated petrolatum. The chlorinated paraffin wax may suitably contain from about 10% to about 40% chlorine. It can be produced in the usual manner.

I prefer that the chlorinated paraffin wax or other plasticizing agent constitute from about 5% to about 25% of the total mixture of chlorinated viscoresin and chlorinated plasticizing agent.

As an example of a coating composition in accordance with my invention 90% of chlorinated viscoresin containing 50% chlorine can be incorporated with 10% of chlorinated paraffin wax containing about 30% chlorine and this mixture can be applied in carbon tetrachloride solution as a coating composition for paper, fabric, Cellophane, leather, armature windings, insulated wire, concrete, etc.

While I have described my invention in connection with certain specific embodiments thereof, it is to be understood that these are by way of illustration and not by way of limitation and the invention is limited only by the scope of the appended claims which should be construed as broadly as the prior art will permit.

I claim:

1. A coating composition consisting of about 90% chlorinated isobutylene polymers containing about 50% chlorine and about 10% of chlorinated paraffin wax containing about 30% chlorine.

2. The method of preparing a composition of matter capable of forming a glossy, flexible and fire-resistant coating, which comprises the steps of highly chlorinating a high molecular weight polymer of an iso-olefin hydrocarbon to produce a hard and brittle chlorinated polymer containing from about 45% to about 65% of chlorine, incorporating with said polymer from about 5% to about 25% of a chlorinated paraffin wax containing from about 10% to about 40% chlorine, and dissolving the modified polymer in a volatile organic solvent.

3. The method according to claim 2 in which said polymer is an isobutylene polymer.

CARL MAX HULL.